Oct. 9, 1923.
G. H. MEADE
ROUTE INDICATOR
Filed Oct. 8, 1921
1,470,385
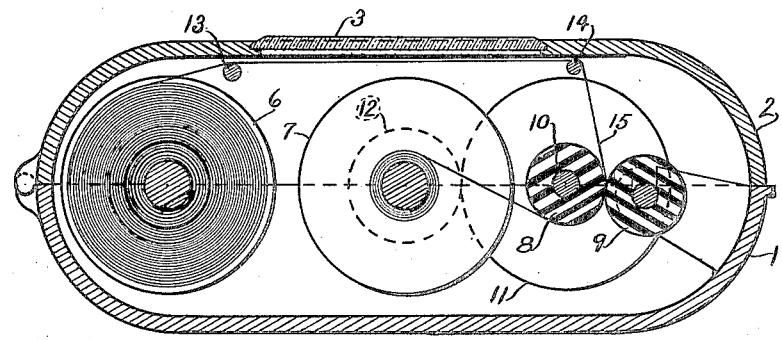
FIGURE 1
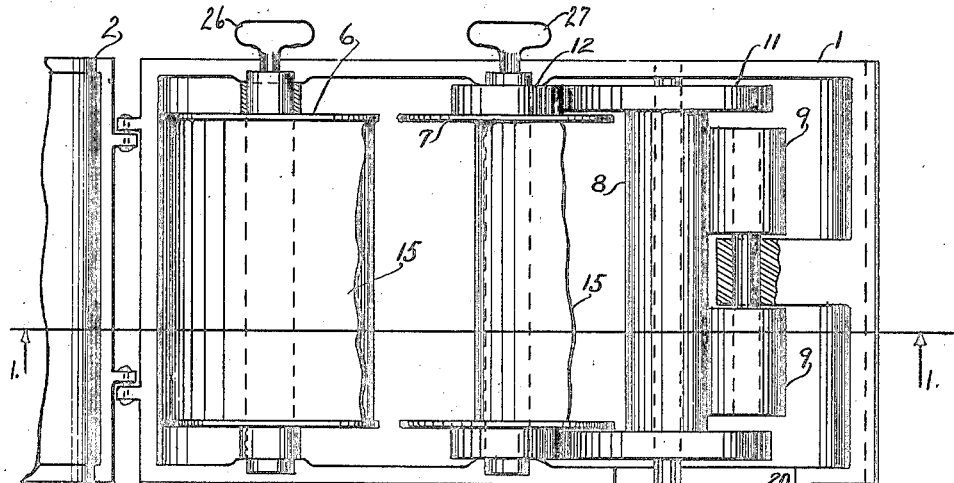
FIGURE 2
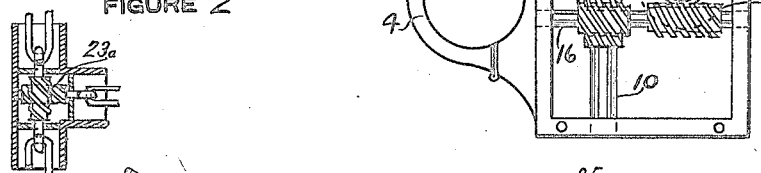
FIGURE 3
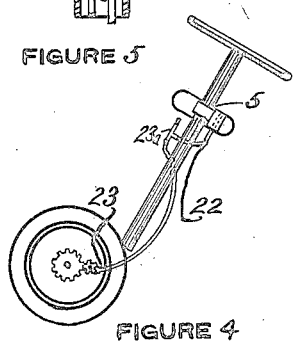
FIGURE 5
FIGURE 4
INVENTOR
Grover H. Meade
John A. Naismith
BY         ATTORNEY Patented Oct. 9, 1923.

1,470,385

UNITED STATES PATENT OFFICE.

GROVER H. MEADE, OF SAN JOSE, CALIFORNIA.

ROUTE INDICATOR.

Application filed October 8, 1921. Serial No. 506,459.

*To all whom it may concern:*

Be it known that I, GROVER H. MEADE, a citizen of the United States, and resident of San Jose, in the county of Santa Clara and State of California, have invented certain new and useful Improvements in a Route Indicator, of which the following is a specification.

It is the object of my invention to provide a route indicator adapted to be mounted upon the steering post of an automobile, and operated by a connection to the speedometer chain. It is a further object to provide a device of the character indicated that will be simple, accurate and positive in operation and provided with means for rendering it inoperative and for effecting the manual adjustment of the indicator ribbon.

In the drawing,—

Figure 1 is a sectional view on line 1—1 of Figure 2.

Figure 2 is a plan view of the device with the top removed and part broken away.

Figure 3 is a sectional elevation showing the worm release construction.

Figure 4 is a diagrammatical view of the device in position on the steering post of a vehicle.

Figure 5 is an enlarged detail section of the speedometer chain connection.

Referring more particularly to the drawing, I show at 1 a casing fitted with a cover 2 having a window 3 therein, and with a clamp 4 whereby it is attached to the steering post of an automobile as indicated at 5.

Revolubly mounted in casing 1 are spaced spools 6 and 7 arranged as shown. In the end of casing 1 opposite to spool 7 are a pair of contracting rollers 8 and 9 made of suitable material as vulcanized rubber, the roller 9 being an idler and the roller 8 being driven through the medium of a shaft 10. Roller 8 carries a friction wheel 11 contacting with a friction wheel 12 mounted to revolve with spool 7. At either end of window 3, and within the casing 1 are mounted guides 13-14, and at 15 is shown a ribbon of suitable material carrying a road map and mounted on spool 6. This ribbon passes over guides 13-14 and under window 3, thence between rollers 8-9 and on to spool 7. When shaft 10 is rotated the ribbon is drawn off of spool 6 by rollers 8 and 9 and wound upon spool 7. Since spool 7 is driven by shaft 10 through the medium of friction wheels 11-12 it is wound up on spool 7 at a speed commensurate with the speed of shaft 10.

As a means for driving shaft 10 at a low speed proportional to the speed of the vehicle, I mount a shaft 16 in casing 1 at right angles to shaft 10 and provide engaging worm gears 17 and 18 at the point of their intersection. On shaft 16 I also provide another worm gear 19 engaging a worm gear 20 on a vertical shaft 21 set in casing 1 and rotated by a flexible drive 22 connected to the speedometer chain 23 of the automobile as at 23°. These several gears are so proportioned that the ribbon will move slowly under window 3. Since its movements vary directly in proportion to the varying speed of the vehicle, that portion of the map representing the portion of the road over which the vehicle is moving is always in view.

The shaft 21 is separable as at 24 so that its upper portion 25 may be raised and disengaged from the lower portion thereby rendering the device inoperative.

In operation the spool 6 is fitted with a ribbon carrying a road map between given points and the ribbon threaded on the several elements as described. The device will now automatically display the map at the proper speed as the road delineated thereon is traveled over. In making a detour or during stop overs at intermediate places the connection 24 may be broken thereby preventing the unrolling of the map. When the journey is again taken up the map may be adjusted by operating spools 6 and 7 by means of buttons 26 or 27 as the case may be and the connection 24 again thrown into engagement.

It may now be seen that I have provided a device that is simple, compact, positive in operation and highly efficient in its practical application.

It is to be understood, of course, that changes in form, construction and method of operation may be made within the scope of the appended claim.

I claim:—

A route indicator comprising a casing, spools journaled therein, a ribbon windable upon said spools, a driving roller journaled in the casing, a driving wheel fixed at each end of the roller and operatively engaging one of said spools to drive the same, a journal bearing arm extending from the casing walls toward the roller, and a pair of idler rollers supported on opposite sides of said arm in a journal bearing therein and pressing against the first roller at points between the spaced driving wheels.

GROVER H. MEADE.